US012689917B2

(12) United States Patent
Awan et al.

(10) Patent No.: US 12,689,917 B2
(45) Date of Patent: Jul. 21, 2026

(54) DETERMINING A SUBSET OF BASE STATIONS IN A WIRELESS NETWORK

(71) Applicant: Telefonaktiebolaget LM Ericsson (publ), Stockholm (SE)

(72) Inventors: Ahsan Javed Awan, Vallentuna (SE); M Saravanan, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 221 days.

(21) Appl. No.: 18/699,138

(22) PCT Filed: Oct. 18, 2021

(86) PCT No.: PCT/SE2021/051024
§ 371 (c)(1),
(2) Date: Apr. 5, 2024

(87) PCT Pub. No.: WO2023/068972
PCT Pub. Date: Apr. 27, 2023

(65) Prior Publication Data
US 2024/0414564 A1      Dec. 12, 2024

(51) Int. Cl.
*H04W 24/02* (2009.01)
*G06N 10/60* (2022.01)

(52) U.S. Cl.
CPC ............ *H04W 24/02* (2013.01); *G06N 10/60* (2022.01)

(58) Field of Classification Search
CPC ............................... G06N 10/60; H04W 24/02
See application file for complete search history.

(56) References Cited

U.S. PATENT DOCUMENTS

| | | | |
|---|---|---|---|
| 2012/0106464 A1 | 5/2012 | Ma et al. | |
| 2013/0294288 A1* | 11/2013 | Choi ..................... | H04L 47/745 370/254 |
| 2016/0338075 A1* | 11/2016 | McKibben ............ | H04W 16/02 |
| 2018/0242169 A1 | 8/2018 | Kowal et al. | |

(Continued)

FOREIGN PATENT DOCUMENTS

| | | |
|---|---|---|
| CN | 105392161 B | 5/2017 |
| CN | 108366426 A | 8/2018 |

(Continued)

OTHER PUBLICATIONS

Gui, Jihong, Zhipeng Jiang, and Suixiang Gao. "PCI planning based on binary quadratic programming in LTE/LTE-a networks." IEEE Access 7 (2018): 203-214. (Year: 2018).*

(Continued)

*Primary Examiner* — Kari L Schmidt

(74) *Attorney, Agent, or Firm* — COATS & BENNETT, PLLC

(57) ABSTRACT

Methods and apparatus are provided. In an example aspect, a method of determining a subset of base stations, BSs, in a wireless network is provided. The method comprises forming a minimization problem, wherein the minimization problem represents a problem 5 of determining a subset of BSs in the wireless network to which one or more user equipments, UEs, in the wireless network can connect, so as to maximize a measure of efficiency of the wireless network, and executing the minimization problem using a quantum computing device to determine the subset of BSs.

18 Claims, 5 Drawing Sheets

200

Form a minimization problem, wherein the minimization problem represents a problem of determining a subset of BSs in the wireless network to which one or more user equipments, UEs, in the wireless network can connect, so as to maximize a measure of efficiency of the wireless network — 202

Execute the minimization problem using a quantum computing device to determine the subset of BSs — 204

(56)  References Cited

U.S. PATENT DOCUMENTS

| | | | |
|---|---|---|---|
| 2019/0087388 A1 | 3/2019 | Venturelli et al. | |
| 2021/0216897 A1 | 7/2021 | Woerner et al. | |
| 2021/0274437 A1* | 9/2021 | Gilson | H04W 36/0069 |
| 2022/0050709 A1* | 2/2022 | Tomita | G06F 16/9024 |
| 2022/0209844 A1* | 6/2022 | Jamieson | H04L 1/0054 |
| 2022/0253504 A1* | 8/2022 | Mandal | G06F 17/16 |
| 2023/0342416 A1* | 10/2023 | Ide | G06F 17/16 |

FOREIGN PATENT DOCUMENTS

| | | |
|---|---|---|
| KR | 101529131 B1 | 7/2015 |
| WO | 2019064050 A1 | 4/2019 |
| WO | 2013023698 A1 | 2/2023 |

OTHER PUBLICATIONS

H. Wang, W. Wang, J. Huang, D. Huo and Y. Xu, "Modeling multiple unmanned aerial vehicles placement problem in ad hoc network via quadratic unconstrained binary optimization," 2013 International Conference on Unmanned Aircraft Systems (ICUAS), Atlanta, GA, USA, 2013, pp. 926-932. (Year: 2013).*

Fahim, Ahmed, and Yasser Gadallah. "An optimized LTE-based technique for drone base station dynamic 3D placement and resource allocation in delay-sensitive M2M networks." IEEE Transactions on Mobile Computing 22.2 (2021): 732-743. (Year: 2021).*

Pham, Quoc-Viet, et al. "Whale optimization algorithm with applications to resource allocation in wireless networks." IEEE Transactions on Vehicular Technology 69.4 (2020): 4285-4297. (Year: 2020).*

Tomasiewicz D. et al., "Foundations for Workflow Application Scheduling on D-Wave System", LNCS 12142, pp. 516-530, 2020, Springer Nature Switzerland AG.

Xie, R. et al.,"Energy-Efficient Joint Content Caching and Small base Station Activation Mechanism Design in Heterogeneous Cellular Networks", Future Internet Architecture and Testbeds, Oct. 2017, pp. 70-83, China Communications.

Olsson, M. et al., "5GrEEn: Towards Green 5G Mobile Networks." , 1st International Workshop on GReen Optimized Wireless Networks (GROWN'13), Oct. 7-9, 2013, pp. 212-216, IEEE.

Tran, G. et al., "Dynamic cell activation and user association for green 5G heterogeneous cellular networks", 2015 IEEE 26th International Symposium on Personal, Indoor and Mobile Radio Communications, Aug. 30-Sep. 2, 2015, pp. 2364-2368, IEEE.

Vyskocil, T. et al., "Constraint embedding for solving optimization problems on quantum annealers", 2019 IEEE International Parallel and Distributed Processing Symposium Workshops, May 20-24, 2019 pp. 635-644, IEEE.

Yao, J. et al., "QoS-Aware Joint BBU-RRH Mapping and User Association in Cloud-RANs", IEEE Transactions on Green Communications and Networking, vol. 2, No. 4, Dec. 2018, pp. 881-889, IEEE.

Shirzad, F. et al., "Joint Computing and Radio Resource Allocation in Cloud Radio Access Networks", 2021 IEEE 18th International Conference on Mobile Ad hoc and Smart Systems, Oct. 4-7, 2021, pp. 518-526, IEEE.

Claussen, H. et al., "Dynamic Idle Mode Procedures for Femtocells", Bell Labs Technical Journal, vol. 15, Issue 2, Sep. 2010, pp. 95-116, IEEE.

Liu, C. et al., "Small Cell Base Station Sleep Strategies for Energy Efficiency", IEEE Transactions on Vehicular Technology, vol. 65, No. 3, Mar. 2016, pp. 1652-1661, IEEE.

Ashraf, I. et al., "Sleep Mode Techniques for Small Cell Deployments", IEEE Communications Magazine, vol. 49, Issue 8, Aug. 2011, pp. 72-79, IEEE.

Mahbas, A. et al., "Impact of Small Cells Overlapping on Mobility Management", IEEE Transactions on Wireless Communications, vol. 18, No. 2, Feb. 2019, pp. 1054-1068, IEEE.

Adachi, K. et al., "Adaptive Coordinated Napping (CoNap) for Energy Saving in Wireless Networks", IEEE Transactions on Wireless Communications, vol. 12, No. 11, Nov. 2013, pp. 5656-5667, IEEE.

Gong, J. et al., "Base Station Sleeping and Resource Allocation in Renewable Energy Powered Cellular Networks", IEEE Transactions on Communications, vol. 62, No. 11, Nov. 2014, pp. 3801-3813, IEEE.

Cisco, "Cisco Visual Networking Index Forecast Projects Nearly 11-Fold Increase in Global Mobile Data Traffic from 2013 to 2018", Feb. 2014,pp. 1-7, retrieved on Feb. 29, 2024, https://newsroom.cisco.com/c/r/newsroom/en/us/a/y2017/m02/cisco-mobile-visual-networking-index-vni-forecast-projects-7-fold-increase-in-global-mobile-data-traffic-from-2016-2021.html.

* cited by examiner

Figure 2:
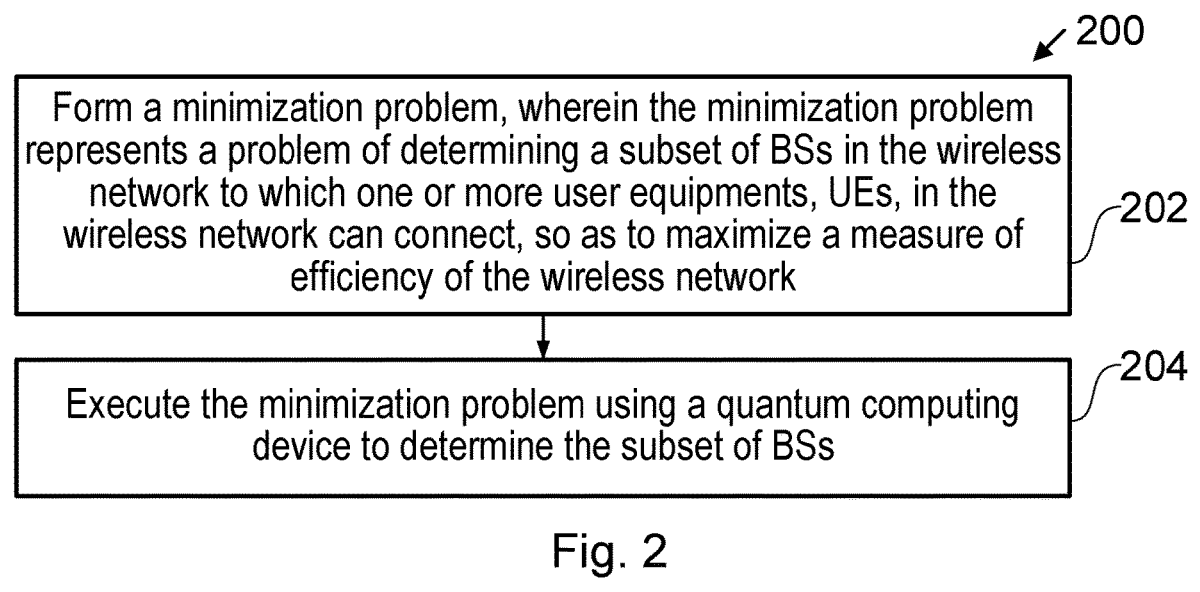

200

Form a minimization problem, wherein the minimization problem represents a problem of determining a subset of BSs in the wireless network to which one or more user equipments, UEs, in the wireless network can connect, so as to maximize a measure of efficiency of the wireless network

202

Execute the minimization problem using a quantum computing device to determine the subset of BSs

DETERMINING A SUBSET OF BASE STATIONS IN A WIRELESS NETWORK

TECHNICAL FIELD

Examples of the present disclosure relate to determining a subset of base stations (BSs) in a wireless network, for example using a method that uses a quantum computing device.

BACKGROUND

Next generation wireless networks are required to be both spectrally and energy efficient, in order to enable these networks to support increase in traffic demand, and to enable sustainable development of these networks. It is expected that the system rate of current wireless networks must be improved by at least an order of magnitude in order to meet the expected future traffic demand for next generation wireless networks. Additionally, the base stations of wireless networks presently consume more than 80% of the overall power consumption of these networks.

There currently exist mobile network topologies, deployment strategies and techniques that can reduce the power consumption of base stations to improve the overall energy efficiency of a network. However, these solutions do not consider the impact on the system rate of the network.

These existing solutions focus independently on each of the small cells within the network, focus on a short duration in which "sleep mode" is performed for each resource block in the time or the frequency domain, and do not consider user traffic demand. As a result, these existing techniques do not guarantee a globally optimal solution for the network. It will be appreciated that each small cell (or a micro cell) of a wireless network (that are respectively served by a small cell base station) has a coverage area at least partially within a coverage area of a macro cell of the wireless network. The macro cell is served by the macro base station of the wireless network.

Another existing solution focuses on the joint optimization of both user allocation to base stations within the network, and the dynamic activation/deactivation of these base stations (in accordance with varying traffic demands), in order to maximize the system rate of the network over the energy consumption of the network.

An example of a wireless network 100 for which this solution may be implemented is illustrated in FIG. 1. In the wireless network 100, a plurality of small cell base stations 102a, 102b, 102c, 102d are deployed within the coverage area of a macro cell 104. The plurality of small cell base stations 102a, 102b, 102c, 102d may be utilized for data offloading by the wireless network 100, via the allocation of users 106a, 106b, 106c, 106d, 106e, 106f to the small cells 108a, 108b, 108c, 108d containing the users, rather than allocating these users to the macro cell base station 110.

In this illustrated example, the base stations are enhanced remote radio heads (RRHs), which are connected to baseband unit (BBU) pools through front-haul, to form a cloud radio access network (C-RAN) 112 at which centralized signal processing is performed. This illustrated network architecture realizes control-plane/user-plane (C/U) splitting in which the macro cell base station 110 manages the control-plane of all the users of the wireless network 100. The users can maintain an active main control-plane connection, typically within the long-range macro cell 104, and activate user-plane connections to different base stations that act as the best data traffic bearers (according to both user and network status). When a user is in an idle state, it is connected to the macro base station 110. The small cell BSs 102a, 102b, 102c, 102d can be deactivated when no data session is active, or the traffic load for a particular small cell BS is small. The session is initiated by a request from the macro base station 110 on the control-plane to alert the user.

The aforementioned solution decomposes the joint optimization problem such that both an optimal user association and an optimal set of activated BSs that maximizes the system rate over consumed energy may be determined. The optimal user association procedure firstly allocates macro and small cell indices to all the user equipments (UEs). These indices indicate the small cell BS which can provide the largest link spectral efficiency for the particular UE. This allocation therefore partitions one macro cell area into many small cell areas overlapping with the macro area. Based on the macro cell area partitioning, the system optimization problem of maximizing system rate over consumed energy is then partitioned into a sub-problem for each small cell. The sub-problem is then formulated as binary integer linear program (BILP), whereby the solution gives the optimal user association for each small cell, and determines the cell rate over the consumed energy of the small cell. The system rate over the consumed energy of the network is then determined, and it is determined whether this metric has improved.

In the case the metric has improved, the method terminates. If the metric has not improved, the small cell with lowest rate over consumed energy is inactivated, the small cell areas are repartitioned, and the method is repeated.

It will be appreciated that this partitioning does not account for overlapping small cells where these multiple small cells can provide sufficient spectral efficiency to the UEs in the overlapping region. It will also be appreciated that disregarding this overlap may affect the accuracy of the "optimal" solution that is obtained. Additionally, the number of BILP instances to be solved scale with the number of small cells for the current solution, and the process of finding the optimal set of activated BSs is iterative, which then involves solving a computationally intensive user association problem for each small cell in each iteration. Furthermore, due to the decomposition approach of solving the joint optimization problem of maximizing system rate over consumed energy, the optimality of the obtained solution cannot be guaranteed.

SUMMARY

A first aspect of the present disclosure provides a method of determining a subset of base stations, BSs, in a wireless network. The method comprises forming a minimization problem, wherein the minimization problem represents a problem of determining a subset of BSs in the wireless network to which one or more user equipments, UEs, in the wireless network can connect, so as to maximize a measure of efficiency of the wireless network. The method also comprises executing the minimization problem using a quantum computing device to determine the subset of BSs.

Another aspect of the present disclosure provides an apparatus for determining a subset of base stations, BSs, in a wireless network. The apparatus comprises a processor and a memory. The memory contains instructions executable by the processor such that the apparatus is operable to form a minimization problem, wherein the minimization problem represents a problem of determining a subset of BSs in the wireless network to which one or more user equipments, UEs, in the wireless network can connect, so as to maximize a measure of efficiency of the wireless network, and execute the minimization problem using a quantum computing device to determine the subset of BSs.

A further aspect of the present disclosure provides an apparatus for determining a subset of base stations, BSs, in a wireless network. The apparatus is configured to form a minimization problem, wherein the minimization problem represents a problem of determining a subset of BSs in the wireless network to which one or more user equipments, UEs, in the wireless network can connect, so as to maximize a measure of efficiency of the wireless network, and execute the minimization problem using a quantum computing device to determine the subset of BSS.

Advantages to embodiments of this disclosure may include a considerable increase in the speed of finding solutions, such as an optimal solution, to the aforementioned determination and allocation problems.

BRIEF DESCRIPTION OF THE FIGURES

For a better understanding of examples of the present disclosure, and to show more clearly how the examples may be carried into effect, reference will now be made, by way of example only, to the following Figures in which:

FIG. 2 is a flow chart of an example of a method 200 of determining a subset of base stations, BSs, in a wireless network;

DETAILED DESCRIPTION

Figure 1:
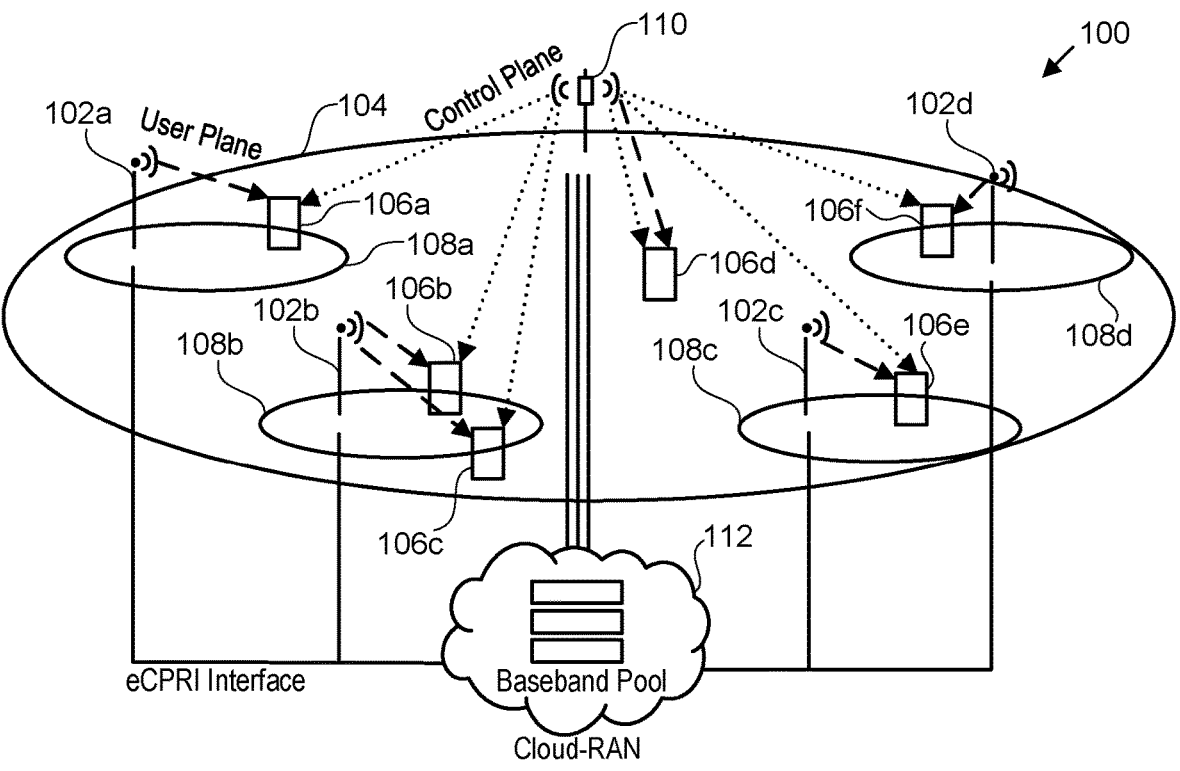
FIG. 1 shows an example of a wireless network 100.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAS, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

It will be appreciated that the terms user, user equipment, and wireless communication device may be used interchangeably throughout the disclosure. Furthermore, the terms coverage region, coverage area, and cell may be used interchangeably throughout the disclosure. Furthermore, the terms system rate and data rate may be used interchangeably throughout the disclosure.

An optimal determination of a subset of base stations, BSs, in a wireless network (such as the wireless network 100, for example) may be achieved by determining the subset of base stations that maximizes a ratio of a data rate of the wireless network over an energy consumption of the subset of BSs to which one or more UEs can connect. Additionally, an optimal allocation of a respective one of the determined subset of BSS for each of the one or more UEs may also then be determined.

It will be appreciated that determining such an optimal subset of base stations and an optimal allocation may be relatively complex, as both the performance experienced by users of the network, and the overall energy consumption of the network, must be taken into account. It will be appreciated that certain subsets of BSs (and resulting determined allocations) may result in an improved data rate, but also result in increased energy consumption, while other subsets of BSs (and resulting determined allocations) may result in reduced energy consumption, but also result in a reduced data rate. For example, one determined subset of base stations may reduce the data traffic at each of the base stations within the subset, thereby improving the spectral efficiency, user data rate, capacity per area and transmission delay, at the expense of energy consumption of the wireless network.

In another example, another determined subset of base stations may comprise the minimum number of base stations that are required to meet the traffic demands of the network. This subset may result in reduced energy consumption of the network, at the expense of system rate (as a greater number of UEs are then allocated between this smaller number of base stations). In other words, multiple users will be likely to be sharing the resources of a limited number of base stations, and therefore may experience degraded performance.

It will be appreciated that the aforementioned optimization problem is considered to be an NP-hard problem. The optimization problem may be formulated as a series of combinatorial optimization problems with corresponding objectives and related constraints. When executed classically, these combinatorial optimization problems take exponentially increasing execution times to produce optimal and near-optimal solutions to the problems. Additionally, when the problem size exceeds a particular limit, the problem can also become intractable. These optimization problems may therefore require considerable computing resources in order to find an optimal solution.

Quantum computers have revolutionized the way in which certain problems may be solved, in particular those problems that belong to the class of NP-hard. In particular, a metaheuristic procedure called quantum annealing has been found to be very effective in solving combinatorial optimization problems, where the goal is to find a particular combination of arguments or variables among many possible combinations that results in a global extremum of a function. If an optimization problem such as the optimal way to determine a subset of BSs in a wireless network so as to maximize a measure of efficiency of the wireless network, can be framed as an energy minimization problem, then a quantum annealing process can be used for example to find the low-energy states of the problem and hence the optimal or near-optimal combination of variables by exploiting the effects of quantum physics.

For a quantum system, a Hamiltonian is a function which maps certain states, called eigenstates, to the corresponding eigen energies, and the collection of these make up the eigen spectrum. This Hamiltonian can be viewed as the sum of two terms: (i) initial Hamiltonian whose lowest-energy state is when all the qubits are in a superposition state of 0 and 1; and (ii) final Hamiltonian or problem Hamiltonian whose lowest-energy state is the solution to the problem that we are trying to solve. In quantum annealing, we begin in the lowest-energy eigenstate of the initial Hamiltonian. In an example annealing process, we gradually increase the influence of the problem Hamiltonian, which contains the qubit biases and coupling strengths between qubits, and we gradually decrease the influence of the initial Hamiltonian and at the end of it, we will be in the eigenstate of the problem Hamiltonian. Ideally, we have stayed in the minimum energy state throughout the quantum annealing process so that, by the end of the process, we are in the minimum energy state of the problem Hamiltonian and therefore have a solution to the problem we want to solve. In some examples, by the end of the quantum annealing process, each qubit is a classical object. In other words, a quantum annealing process may find an optimal combination of variables that yield a global optimum of an objective function, where the objective function corresponds to an optimization problem.

In examples of this disclosure, the problem of determining a subset of BSs in the wireless network so as to maximize a measure of efficiency of the wireless network, may be presented as a minimization problem. In some examples of this, the minimization problem may further represent a problem of determining an allocation of a respective one of the determined subset of BSs for each of the one or more UEs.

In some examples the minimization problem may be transformed to a quadratic unconstrained binary optimization (QUBO) problem that can be embedded on and solved directly by a quantum computing device such as a quantum annealing device, which works based on quantum mechanical phenomena such as superposition, entanglement and quantum tunneling.

A QUBO problem is defined for example using an upper triangular matrix Q of size N×N with N being the number of logical qubits and a binary vector $X=(x_1 \ x_2 \ \ldots \ x_N)^T$, as minimizing the following energy function E:

$$E(Q, x) = \sum_i Q_{i,i} x_i + \sum_{i<j} Q_{i,j} x_i x_j$$

where $x_i \in \{0,1\}$ and $Q_{ij} \in \mathbb{R}$, i, j=1, 2, . . . , N. Each output decision variable $x_i$ represents the measured value (classical) of a logical qubit. The main diagonal elements $Q_{ii}$ of the matrix Q are the linear coefficients in the function E which represents the qubit biases, and the off-diagonal elements $Q_{ij}$ of the matrix Q are the quadratic coefficients in the function E which represents the coupling strengths between neighboring qubits. Note that, $$x_i^2 = x_i \text{ as } x_i \in \{0, 1\}.$$

This can be expressed more concisely in some examples as:

$$\min_{x \in \{0,1\}^N} x^T Q x$$

Mapping an optimization problem (such as for example a problem of determining an optimal subset of base stations, and a problem of determining an optimal allocation, as described above) into the QUBO format in some examples may involve calculating the appropriate values of all the elements of the matrix Q such that a solution vector x that minimizes E will represent an optimal solution to the original non-QUBO optimization problem formulation, e.g. the problem of optimal or near-optimal determination of a subset of BSs in a wireless network, and/or the problem of optimal or near-optimal allocation of a respective one of the determined subset of BSs for each of the one or more UEs, so as to maximize a measure of efficiency of the wireless network.

FIG. 2 is a flow chart of an example of a method 200 of determining a subset of base stations, BSs, in a wireless network (for example, the wireless network 100). The method comprises, in step 202, forming a minimization problem, wherein the minimization problem represents a problem of determining a subset of BSs in the wireless network to which one or more user equipments, UEs, in the wireless network can connect, so as to maximize a measure of efficiency of the wireless network. Step 204 of the method 200 comprises executing the minimization problem using a quantum computing device to determine the subset of BSs. This may comprise for example performing a quantum annealing process.

The quantum computing device may be for example a quantum annealer such as from D-Wave Systems Inc. An example of such a device is the D-Wave 2000Q, which may in some examples execute the minimization problem. In other examples, the quantum computing device may be another type of quantum computing device. The quantum computing device may execute the minimization problem in any suitable location, including for example local to the entity performing the method 200, at the same premises as the entity performing the method 200, or remote from the entity performing the method 200. In some examples, executing the minimization problem on a quantum computing device may comprise sending instructions to the quantum computing device, which may be local or remote, to execute the minimization problem.

In some examples, the measure of efficiency of the wireless network may represent a data rate of the one or more UEs in the wireless network, over an energy consumption of the subset of BSs to which the one or more UEs can connect.

The data rate of the one or more UEs in the wireless network, over the energy consumption of the subset of BSs to which the one or more UEs can connect, p, may be expressed mathematically as follows:

$$\rho = \frac{\sum_{i \in M} \min(D_i^m, L_i) + \sum_{s=1}^{n_s} \sum_{j \in s} \min(D_j^s, L_j)}{P_m + \sum_{s=1}^{n_s} P_s}$$

where $$D_i^m \text{ and } D_j^s$$

respectively represent a maximum downlink data rate for a user i connected to a $m^{th}$ macro cell BS (for example, the macro cell BS 110 of FIG. 1), and a maximum downlink data rate for a user j connected to s$^{th}$ small cell BS (for example, the small cell BS 102a, 102b, 102c, 102d of FIG. 1). In some examples, the measured signal-to-noise ratio for a user may be used to determine the downlink data rate for that user.

$L_i$ then represents the traffic demand of the user i in bits/second. Therefore, in this example, $$D_i^m$$

represents an upper limit for $L_i$, and $$D_j^s$$

represents an upper limit for $L_j$.

The number of users in the wireless network that belong to a $m^{th}$ macro cell BS is then denoted as M.

S then represents a set of users associated to a s$^{th}$ small cell BS. It will be appreciated that this association may be determined by executing the method 200 described above.

$n_s \leq N_s$ then represents a total number of activated small cell BSs within a $m^{th}$ macro cell area. It will be appreciated that this set of base stations may be determined by executing the method 200 described above.

$N_s$ then represents a total number of small cell BSs deployed within a $m^{th}$ macro cell area, and $P_m$ and $P_s$ respectively represent a transmit power of a $m^{th}$ macro cell and a s$^{th}$ small cell. In this example, it is assumed that the respective transmit power of each of the base stations within the wireless network is fixed. In this example, p is determined in bps/J.

In other words, parameters that may impact the measure of efficiency of the wireless network may include one or more of: user locations, SNR requirements of each of the users, the capacity of each of the base stations, base station locations, the number of users enclosed by the coverage region of each base station, the transmit power of each of the base stations, the number of users in the wireless network, the number of base stations in the wireless network, and traffic demand.

Following the execution of the method 200, BSs in the wireless network may be activated and/or deactivated in accordance with the determined subset of BSs. In some examples, following the execution of the method 200, each of the one or more UEs may be initiated to connect to the respective one of the determined subset of BSs to which the UE has been allocated. In some examples, the method 200 may further comprise initiating, for each of the BSs in the wireless network that do not form part of the determined subset of BSs, the BS to deactivate. In some examples, the method 200 may further comprise initiating, for each of the BSs in the wireless network that form part of the determined subset of BSs, the BS to activate.

In particular examples of the method 200, the minimization problem may comprise a quadratic unconstrained binary optimization, QUBO, problem. In some examples, forming the QUBO problem may comprise defining a binary integer linear programming, BILP, problem, wherein the BILP problem comprises a problem of determining a subset of BSs in the wireless network to which UEs in the wireless network can connect so as to maximize a measure of efficiency of the wireless network. In some examples, the BILP problem further comprises a problem of determining an allocation of a respective one of the determined subset of BSs for each of the one or more UEs. An example method for defining a BILP problem is described in greater detail with reference to FIG. 3.

In some examples, the BILP problem may then be expressed as a QUBO problem, which may in some examples then be executed using a quantum computing device to determine the subset of BSs. In some examples, execution of the QUBO problem using a quantum computing device may also determine the allocation of a respective one of the determined subset of BSs for each of the one or more UEs. An example method for expressing a BILP problem as a QUBO problem is described in greater detail with reference to FIG. 4.

Figure 3:
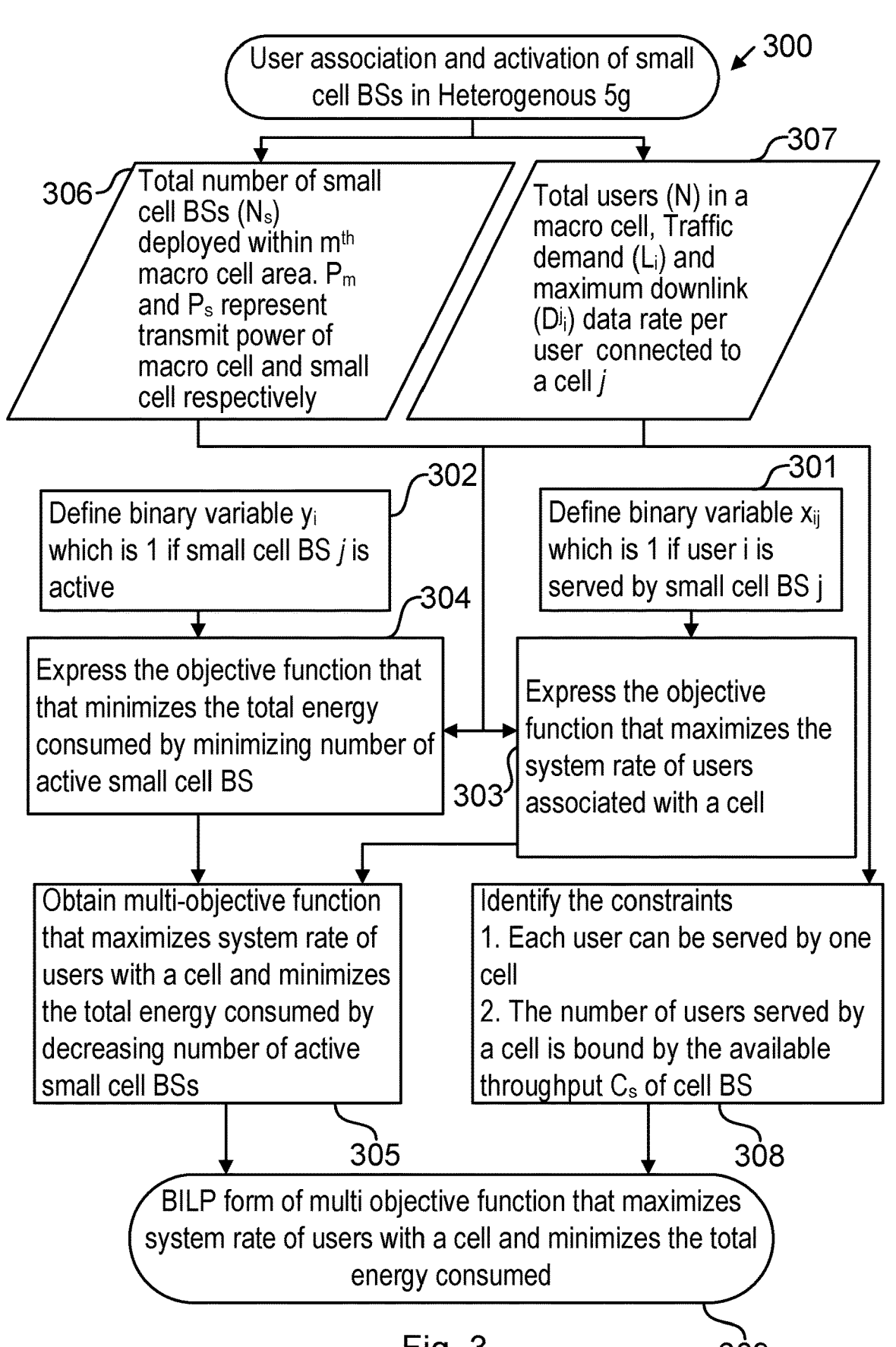
FIG. 3 shows an example of a method 300 of defining a binary integer linear programming, BILP, problem.

FIG. 3 is a flow chart of an example of a method 300 of defining a binary integer linear programming, BILP, problem, that comprises a problem of determining a subset of BSs in the wireless network to which UEs in the wireless network can connect so as to maximize a value of an objective function of the BILP problem, wherein the value of the objective function indicates the measure of efficiency of the wireless network. The defined BILP problem may then be used in accordance with the method 200 described above.

Furthermore, in this example, the BILP problem comprises a problem of determining an allocation of a respective one of the determined subset of BSs for each of the one or more UEs.

At step 301 of the method 300, a first set of binary variables is defined as follows:

$$x_{ij} = \begin{cases} 1, & \text{if a user } i \text{ is served by a cell } BS \text{ } j \\ 0, & \text{otherwise} \end{cases}$$

for i=1, 2, . . . , N and j=1, 2, . . . , $N_s$ where N represents a total number of users in a $m^{th}$ macro cell, and $N_s$ represents a total number of small cell BSs deployed within a $m^{th}$ macro cell area.

At step 302 of the method 300, a second set of binary variables is defined as follows:

$$y_j = \begin{cases} 1, & \text{if } jth \text{ small cell } BS \text{ is active} \\ 0, & \text{otherwise} \end{cases}$$

At step 303, a first component of the objective function is formed based on the first set of binary variables, wherein the first component represents the data rate of the one or more UEs in the wireless network. In this example, the first component may be expressed mathematically as follows:

$$-\sum_{j=1}^{N_s+m} \sum_{i=1}^{N} \min(D_i^j, L_i) x_{ij}$$

Where m=1 for the $m^{th}$ macro cell and $$D_i^j$$

is maximum downlink data rate for user i connected to cell j BS.

Therefore, it will be appreciated that in this example, the BILP problem comprises a problem of determining an allocation of a respective one of the determined subset of BSs for each of the one or more UEs.

At step 304, a second component of the objective function is formed based on the second set of binary variables, wherein the second component represents the energy consumption of the BSs in the wireless network. In this example, the second component may be expressed mathematically as follows:

$$P_m + \sum_{j=1}^{N_s} P_j y_j$$

Therefore, it will be appreciated that in this example, the BILP problem comprises a problem of determining a subset of BSs in the wireless network to which UEs in the wireless network can connect.

At step 305, the first and second components are combined to form the objective function as follows:

$$P_m + \sum_{j=1}^{N_s} P_j y_j - \sum_{j=1}^{N_s+m} \sum_{i=1}^{N} \min(D_i^j, L_i) x_{ij}$$

It will be appreciated that, in this example, the aforementioned BILP problem can therefore be solved by determining a subset of BSs in the wireless network to which UEs in the wireless network can connect, and by determining an allocation of a respective one of the determined subset of BSs for each of the one or more UEs, so as to maximize a value of the objective function. It will also be appreciated that the optimal or near-optimal solution of the objective function will maximize the system rate of the users of the wireless network, and minimize the total energy consumed by the base stations of the wireless network.

That is, an optimal solution to the BILP problem can be found by determining the values of the first and second sets of binary variables that maximize the value of the objective function. The values of the first set of binary variables will then correspond to joint optimal or near-optimal allocation of UEs, and values of the second set of binary variables will correspond to the joint optimal or near-optimal determined subset of BSs. That is, the solution represents a jointly optimal solution that accounts for both system rate and energy consumption simultaneously.

In other words, the first plurality of binary variables of the BILP problem may correspond to whether or not each UE in the wireless network is allocated to a respective one of the base stations in the wireless network, and a second plurality of binary variables of the BILP problem may correspond to whether or not each BS is in the subset of BSs.

In this example, the value of the objective function is therefore based in part on the total number of small cell BSs ($N_s$) deployed within $m^{th}$ macro cell area 306, the transmit power of macro cell and small cells respectively 306, the total number of users (N) in a macro cell 307, the traffic demand ($L_i$) 307, and the maximum downlink $$\left(D_i^j\right)$$

data rate per user i connected to a cell j 307.

At step 308, the constraints of the aforementioned objective function are identified. In this example, a first constraint is identified which dictates that each of the one or more UEs may be allocated to a maximum of one BS in the wireless network, and a second constraint is identified which dictates that the number of UEs allocated to a BS may be limited by the available throughput of the respective BS.

The first constraint may be represented mathematically as follows:

$$\sum_{j=1}^{N_s+m} x_{ij} = 1 \ \forall \ i \in N$$

The second constraint may be represented mathematically as follows:

$$\sum_{i=1}^{N} \min(D_i^j, L_i) x_{ij} \le C_s \ \forall \ j \in N_s + m$$

where $C_s$ is the available throughput of a BS.

Thus, at step 309, a BILP form of the objective function (to which the optimal or near-optimal solution maximizes the system rate of the users of the wireless network, and minimizes the total energy consumed by the base stations of the wireless network) in accordance with the constraints formed at step 308, is formed. In this example, the BILP formulation comprises an objective function which is an algebraic sum of minimization cost function for active base stations in the network, and a maximization cost function for the system rate of the network.

In this example, the optimal or near-optimal solution to the BILP problem will determine a subset of BSs in the wireless network to which UEs in the wireless network can connect, and by determining an allocation of a respective one of the determined subset of BSs for each of the one or more UEs, such that the data rate of the one or more UEs in the wireless network, over an energy consumption of the subset of BSs to which the one or more UEs can connect, is maximized in accordance with the aforementioned constraints.

In other words, the optimal or near-optimal solution to the formed BILP problem will maximize a measure of efficiency of the wireless network.

The BILP problem formed at step 309 may then be expressed as a QUBO problem, in accordance with the method 400 below.

Figure 4:
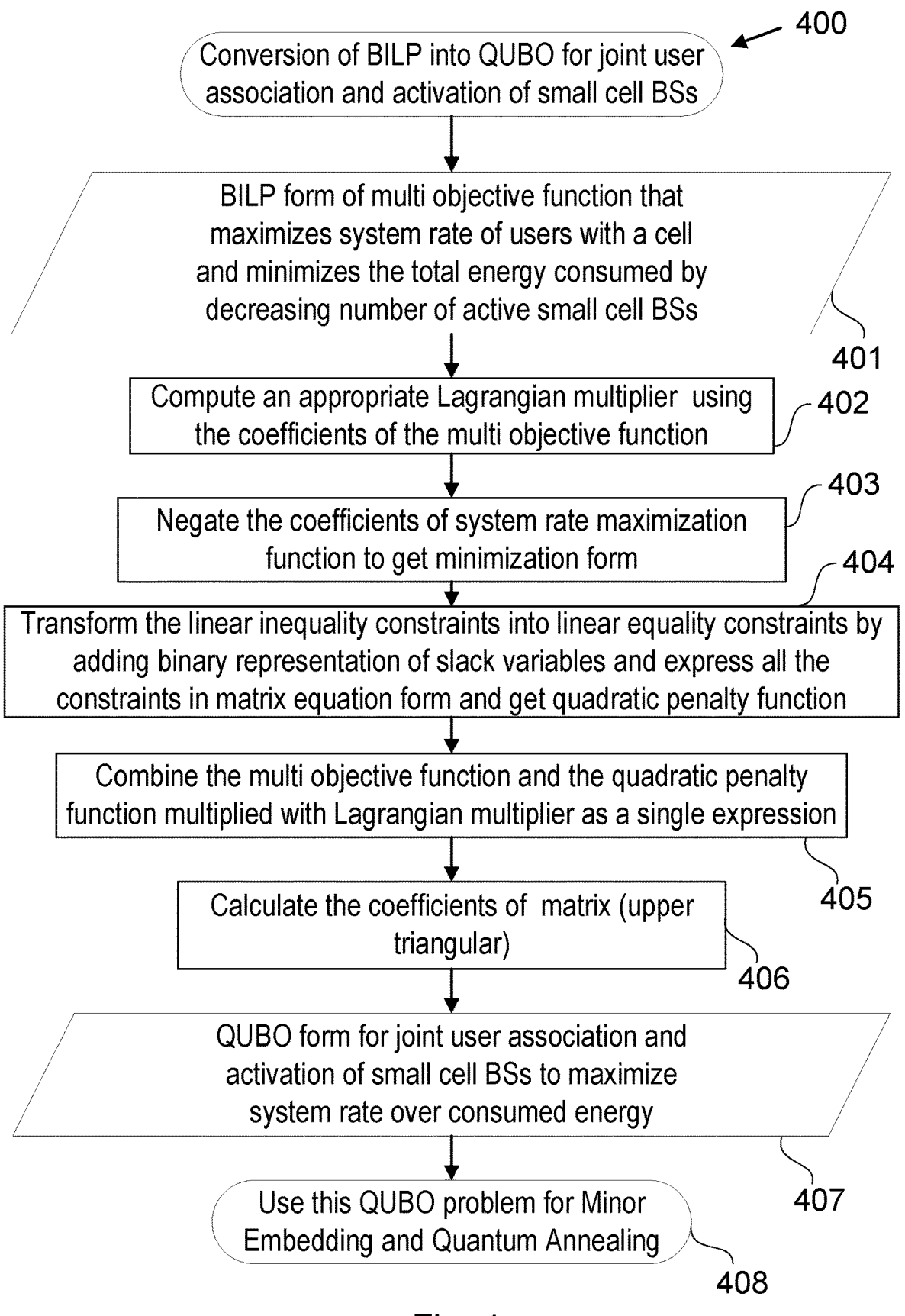
FIG. 4 shows an example of a method 400 of converting an BILP problem into a QUBO problem.

FIG. 4 shows an example of a method 400 of expressing a BILP problem as a QUBO problem. The QUBO problem is able to be naturally embedded on and solved directly by a quantum annealing device, such as the D-Wave quantum annealer. The formed QUBO problem may be used in accordance with the method 200 described above.

At step 401 of the method 400, a BILP form of an objective function (to which the optimal or near-optimal solution maximizes the system rate of the users of the wireless network, and minimizes the total energy consumed by the base stations of the wireless network) is formed. This formation may be in accordance with the method 300 described above.

At step 402, an appropriate Lagrangian multiplier, p, is computed using the coefficients of the objective function. The factor p may be used to scale a penalty term (for example, the quadratic penalty function described below), such that the penalty term exceeds the value of the objective should a constraint be violated (for example, when the available throughput of a base station is exceeded by a potential solution).

At step 403, one or more components of the objective function are negated, so as to form a modified objective function that represents a minimization form of the objective function.

At step 404, one or more constraints of the objective function are transformed into an equivalent quadratic penalty function. In this example, transforming one or more constraints of the objective function into an equivalent quadratic penalty function comprises, for each of the linear inequality constraints, adding a binary representation of one or more slack variables to the linear inequality constraint to form a linear equality constraint. Following this, the one or more constraints are expressed in matrix equation form to obtain a quadratic penalty function $(Ax-b)^2$, where A is a matrix containing the coefficients of the binary variables in the column vector x, and b is a column vector containing the constants in the system of linear equations Ax=b obtained from the constraints described above.

In this example, the slack variable $q_j$, where $j \in N_s+m$ may be added on the left-hand side of the inequality. The upper bound and lower bound of the added slack variable may then be computed from the resultant linear equality constraint. For example $$q_j = \sum_{i=1}^{r_j} 2^i q_{ij}, r_j = \lceil \log_2 C_s \rceil$$

The addition of the quadratic penalty term $(Ax-b)^2$ enables constraints to be accounted for while forming the QUBO problem.

At step 405, the modified objective function, the quadratic penalty function and the Lagrangian multiplier, p, are combined into a single quadratic expression equivalent to the form $x^T Qx$. As noted above, the Lagrangian multiplier, p, may be used to scale the quadratic penalty function.

In this example, the quadratic expression is formed as follows:

$$E = x^T Qx + p(Ax - b)^2$$
$$E = x^T Qx + p[x^T A^T Ax + b^T b = 2b^T Ax]$$

As $b^T b$ is same for all combinations, it can be ignored:

$$E \approx x^T Qx + px^T A^T Ax - 2b^T Ax$$
$$E \approx x^T [Q + pA^T A]x - 2pb^T Ax$$

When $x \in \{0,1\} x^2 = x$ then $2pb^T Ax = x^T \text{diag}(2pb^T A) x$, and where diag(.) is an operator that produces a diagonal matrix from the input vector.

$$E \approx x^T [Q + pA^T A]x - x^T \text{diag}(2pb^T A)x$$
$$E \approx x^T [Q + pA^T A - \text{diag}(2pb^T A)]x$$

At step 406, the coefficients of the upper triangular Q* matrix are calculated.

At step 407, the QUBO form of the minimization problem is formed. The formed QUBO problem is then suitable for embedding and executing in a quantum annealing process. Therefore, in some examples, executing the QUBO problem on a quantum computing device may comprise performing a quantum annealing process 408.

Therefore, in some examples, expressing an BILP problem as a QUBO problem may comprise determining a Lagrangian multiplier based on coefficients of the objective function, negating one or more components of the objective function, so as to form a modified objective function that represents a minimization form of the objective function, transforming one or more constraints of the modified objective function into a general matrix equation form Ax=b, where A is a matrix containing coefficients of binary variables in the column vector x, and b is a column vector containing the constants in the system of linear equations, to form a quadratic penalty function (Ax-b) 2, combining the modified objective function, the quadratic penalty function and the Lagrangian multiplier into a single quadratic expression equivalent to the form $x^T Qx$; and determining the matrix Q from the quadratic expression, wherein the binary variables represent logical qubits in a problem graph for the quantum computing device.

In some examples, the QUBO problem may be embedded into a D-Wave system, and quantum annealing may be applied using D-Wave's QPU. It will be appreciated that a number of anneals may be varied between appropriate values to obtain an optimal or near optimal solution to the aforementioned determination and allocation problem. In some examples, a best state from the results of the execution of the quantum annealing process may be identified. It will be appreciated that the best state may correspond to a minimum energy state of the obtained results, where the minimum energy state then corresponds to the optimal or near optimal solution to the aforementioned determination and allocation problem. It will be appreciated that the best state will represent a determined subset of BSs and an allocation of a respective one of the determined subset of BSs for each of the one or more UEs that maximizes a measure of efficiency of the wireless network.

In this example, the binary variables in the problem represent the logical qubits in the problem graph which will be mapped to the D-Wave's architecture (the Chimera graph) through the embedding process. Following the formation of the QUBO problem, a mapping of binary variables in the BILP formulation (that is, the first and second sets of binary variables) to logical qubits is obtained as:

$$x = (x_1, x_2, \ldots, x_z)^T =$$
$$(y_j \mid j \in N_s, x_{ij} \mid i \in N \wedge j \in (N_s + m), q_{ij} \mid j \in N_s \wedge i \in r_j)$$

That is, following the execution of the QUBO problem, the subset of BSs may be determined from the measured values of the logical qubits. In some examples, the allocation of a respective one of the determined subset of BSs for each of the one or more UEs may also be determined from the measured values of the logical qubits following the execution of the QUBO problem.

It will be appreciated that a quantum annealing approach to solving the aforementioned optimization problems will be considerably shorter than the classical approaches to solving these problems. This shorter time to arrive at an optimal solution can be attributed to the quantum tunneling that occurs as part of the quantum annealing process, allowing the quantum annealing process to overcome local minima and converge to a global minima faster. The superposition, entanglement and quantum tunneling involved in the quantum annealing process together result in a significant improvement in the time required to find an optimal solution to the aforementioned optimization problems.

It will be appreciated that as solving the aforementioned optimization problems according to embodiments of the present disclosure does not require the macro-cell to be portioned, the obtained solution will account for cases in which small cells overlap, and in which users lie in the overlap region. Additionally, solving the aforementioned optimization problems according to embodiments of the present disclosure does not require a user association problem to be iteratively solved, in order to then find the solution for the optimal or near-optimal subset of BSs. Additionally, in some examples, the embodiments of the present disclosure jointly optimize the BS subset determination and corresponding allocation in a single iteration, and this iteration may then be repeated should traffic demand change.

Figure 5:
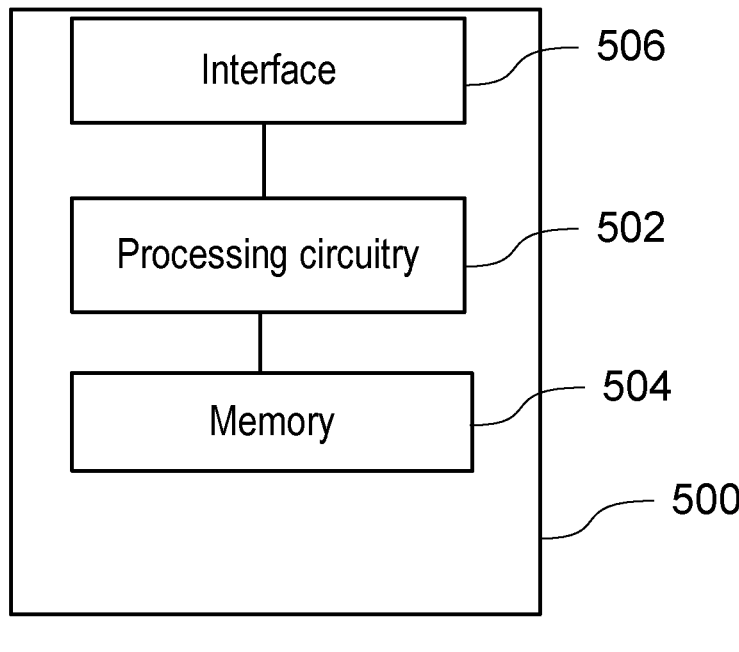
FIG. 5 is a schematic of an example of an apparatus 500 for determining a subset of base stations, BSs, in a wireless network.

FIG. 5 is a schematic of an example of an apparatus 500 for determining a subset of base stations, BSs, in a wireless network. The apparatus 500 comprises processing circuitry 502 (e.g. one or more processors) and a memory 504 in communication with the processing circuitry 502. The memory 504 contains instructions executable by the processing circuitry 502. The apparatus 500 also comprises an interface 506 in communication with the processing circuitry 502. Although the interface 506, processing circuitry 502 and memory 504 are shown connected in series, these may alternatively be interconnected in any other way, for example via a bus.

In one embodiment, the memory 504 contains instructions executable by the processing circuitry 502 such that the apparatus 500 is operable to form a minimization problem, wherein the minimization problem represents a problem of determining a subset of BSs in the wireless network to which one or more user equipments, UEs, in the wireless network can connect, so as to maximize a measure of efficiency of the wireless network, and executing the minimization problem using a quantum computing device to determine the subset of BSs. In some examples, the apparatus 500 is operable to carry out the method 200 described above with reference to FIG. 2.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of determining a subset of base stations (BSs) in a wireless network, the method comprising:

forming a minimization problem, wherein the minimization problem represents a problem of determining a subset of BSs in the wireless network to which one or more user equipments (UEs) in the wireless network can connect, so as to maximize a measure of efficiency of the wireless network, wherein the minimization problem comprises a quadratic unconstrained binary optimization (QUBO) problem;

wherein forming the QUBO problem comprises:

defining a binary integer linear programming (BILP) problem, wherein the BILP problem comprises a problem of determining a subset of BSs in the wireless network to which UEs in the wireless network can connect so as to maximize a measure of efficiency of the wireless network;

wherein a first plurality of binary variables of the BILP problem correspond to whether or not each UE in the wireless network is allocated to a respective one of the base stations in the wireless network;

wherein a second plurality of binary variables of the BILP problem correspond to whether or not each BS is in the subset of BSs; expressing the BILP problem as a QUBO problem;

executing the minimization problem using a quantum computing device to determine the subset of BSs; and activating and/or deactivating BSs in the wireless network in accordance with the determined subset of BSs.

2. The method of claim 1, wherein the minimization problem further represents a problem of determining an allocation of a respective one of the determined subset of BSs for each of the one or more UEs.

3. The method of claim 2, wherein executing the minimization problem using a quantum computing device further determines the allocation of a respective one of the determined subset of BSs for each of the one or more UEs.

4. The method of claim 3, further comprising, for each of the one or more UEs, initiating the UE to connect to a respective one of the determined subset of BSs to which the UE has been allocated.

5. The method of claim 1, wherein executing the minimization problem using a quantum computing device further determines, based on the determined subset of BSs, that one or more BSs in the wireless network are to be activated or deactivated.

6. The method of claim 1, wherein the measure of efficiency of the wireless network represents a data rate of the one or more UEs in the wireless network over an energy consumption of the subset of BSs to which the one or more UEs can connect.

7. The method of claim 6, wherein the objective function comprises:

a first component that represents the data rate of the one or more UEs in the wireless network; and a second component that represents the energy consumption of the BSs in the wireless network.

8. The method of claim 1, wherein each BS in the wireless network is associated with a micro cell of the wireless network that has a coverage area at least partially within a coverage area of a macro cell of the wireless network.

9. The method of claim 1, wherein the BILP problem further comprises a problem of determining an allocation of a respective one of the determined subset of BSs for each of the one or more UEs.

10. The method of claim 1, wherein the BILP problem comprises a problem of determining a subset of BSs in the wireless network to which UEs in the wireless network can connect so as to maximize a value of an objective function of the BILP problem, and wherein the value of the objective function indicates the measure of efficiency of the wireless network.

11. The method of claim 10, wherein the objective function includes one or more constraints including:

a first constraint whereby each of the one or more UEs may be allocated to a maximum of one BS in the wireless network; and/or a second constraint whereby a number of UEs allocated to a BS may be limited by an available throughput of the respective BS.

12. The method of claim 10, wherein expressing the BILP problem as the QUBO problem comprises:

determining a Lagrangian multiplier based on coefficients of the objective function;

negating one or more components of the objective function, so as to form a modified objective function that represents a minimization form of the objective function;

transforming one or more constraints of the modified objective function into a general matrix equation form $Ax=b$, where A is a matrix containing coefficients of binary variables in a column vector x, and b is a column vector containing constants in a system of linear equations, to form a quadratic penalty function $(Ax-b)^2$;

combining the modified objective function, the quadratic penalty function, and the Lagrangian multiplier into a single quadratic expression equivalent to the form $xrQx$; and determining a matrix Q from the quadratic expression, wherein the binary variables represent logical qubits in a problem graph for the quantum computing device.

13. The method of claim 12, wherein transforming the one or more constraints of the modified objective function initially comprises transforming linear inequality constraints of the modified objective function into linear equality constraints by addition of binary representations of a slack variable to each linear inequality constant.

14. The method of claim 12, wherein combining the modified objective function, the quadratic penalty function, and the Lagrangian multiplier comprises scaling the quadratic penalty function by the Lagrangian multiplier.

15. The method of claim 1, wherein for each of the BSs in the wireless network that do not form part of the determined subset of BSs, the method further comprises initiating the BS to deactivate.

16. The method of claim 1, wherein for each of the BSs in the wireless network that form part of the determined subset of BSs, the method further comprises initiating the BS to activate.

17. The method of claim 1, wherein executing the QUBO problem on the quantum computing device comprises performing a quantum annealing process.

18. An apparatus for determining a subset of base stations (BSs) in a wireless network, the apparatus comprising:

processing circuitry; and a memory comprising instructions executable by the processing circuitry such that the apparatus is operable to:

form a minimization problem, wherein the minimization problem represents a problem of determining a subset of BSs in the wireless network to which one or more user equipments (UEs) in the wireless network can connect, so as to maximize a measure of efficiency of the wireless network, wherein the minimization problem comprises a quadratic unconstrained binary optimization (QUBO) problem;

wherein forming the QUBO problem comprises:

defining a binary integer linear programming (BILP) problem, wherein the BILP problem comprises a problem of determining a subset of BSs in the wireless network to which UEs in the wireless network can connect so as to maximize a measure of efficiency of the wireless network;

wherein a first plurality of binary variables of the BILP problem correspond to whether or not each UE in the wireless network is allocated to a respective one of the base stations in the wireless network;

wherein a second plurality of binary variables of the BILP problem correspond to whether or not each BS is in the subset of BSs;

expressing the BILP problem as a QUBO problem;

execute the QUBO problem using a quantum computing device to determine the subset of BSs; and activate and/or deactivate BSs in the wireless network in accordance with the determined subset of BSs.

* * * * *